(12) United States Patent
Descombes

(10) Patent No.: US 6,225,851 B1
(45) Date of Patent: May 1, 2001

(54) TEMPERATURE LEVEL DETECTION CIRCUIT

(75) Inventor: Arthur Descombes, Kerzers (CH)

(73) Assignee: EM Microelectronic-Marin SA, Marin (CH)

( * ) Notice: Subject to any disclaimer, the term of this patent is extended or adjusted under 35 U.S.C. 154(b) by 0 days.

(21) Appl. No.: 09/552,248

(22) Filed: Apr. 19, 2000

(30) Foreign Application Priority Data

Apr. 21, 1999 (SE) .................................................. 0728/99

(51) Int. Cl.$^7$ .................................................. H01L 35/00
(52) U.S. Cl. ........................ 327/512; 327/574; 374/170
(58) Field of Search ............................... 327/77, 82, 512, 327/513, 574, 579, 585; 374/163, 170; 361/103; 257/53

(56) References Cited

U.S. PATENT DOCUMENTS

| | | | |
|---|---|---|---|
| 3,825,778 | | 7/1974 | Ahmed ................................... 307/117 |
| 4,331,888 | * | 5/1982 | Yamauchi ............................... 340/598 |
| 5,039,878 | * | 8/1991 | Armstrong et al. ................... 327/512 |
| 5,159,520 | * | 10/1992 | Toyooka et al. ...................... 361/103 |
| 5,195,827 | * | 3/1993 | Audy et al. ........................... 374/172 |
| 5,686,858 | * | 11/1997 | Matherbe ............................... 327/512 |
| 5,982,221 | * | 11/1999 | Tuthill ................................... 327/512 |
| 6,019,058 | * | 2/2000 | Lien ...................................... 374/178 |

FOREIGN PATENT DOCUMENTS 639 521    11/1983 (CH).
2 292 221  2/1996 (GB).

OTHER PUBLICATIONS

Freire R C S F et al: "A Highley Linear Single P–N Junction Temperature Sensor" IEEE Transactions on Instrumentation and Measurement, vol. 43, No. 2, Apr. 1, 1994, pp. 127–131, XP000438867; ISSN: 0018–9456.

Coughlin R F et al: "A System Approach to Linear Sensor Circuit Design" Electronic Engineering, vol. 65, No. 797, May. 1, 1993, p. 38 XP000362497; ISSN: 0013–4902.

* cited by examiner

Primary Examiner—Timothy P. Callahan
Assistant Examiner—Hai L. Nguyen
(74) Attorney, Agent, or Firm—Sughrue, Mion, Zinn, Macpeak & Seas, PLLC

(57) ABSTRACT

The invention concerns a temperature level detection circuit including means (B1, B2, B3, 11, 12, 21, 31, 32) for generating diode voltages ($V_{BE1}$ to $V_{BE5}$) and calculating means including capacitive elements (51, 52, 53) and switching means (SW1 to SW4) arranged to connect selectively and sequentially, during first and second phases, the capacitive elements (51, 52, 53) to the means generating said diode voltages ($V_{BE1}$ to $V_{BE5}$). During the second phase, the calculating means generating a temperature signal representative of the temperature level being greater than or less than a determined temperature threshold ($T_{limit}$) defined as the temperature value for which the equation $\alpha_1(V_{BE2}-V_{BE1})+\alpha_2(V_{BE3}+\alpha_3(V_{BE5}-V_{BE4}))$ becomes zero, where $\alpha_1$, $\alpha_2$, and $\alpha_3$ are first, second and third proportionality coefficients determined by the values of the capacitive elements.

7 Claims, 3 Drawing Sheets

TEMPERATURE LEVEL DETECTION CIRCUIT

The present invention concerns a temperature level detection circuit. In particular, the present invention relates to a detection circuit generating a temperature signal representative of a temperature greater than or less than a determined temperature threshold.

The detection circuit according to the present invention is intended in particular to be used in a battery protection circuit.

Circuits comparing a voltage to a reference voltage, which is stable in temperature, are known to those skilled in the art. In particular Swiss Patent No. 639 521 discloses a voltage level detection circuit used particularly to indicate the nearing of the end of life of batteries for electronic or electromechanical timepieces.

The voltage level detector circuit disclosed in this Patent compares an input voltage, namely the voltage across the battery terminals, to a reference level, and includes, on the one hand, means for generating a first, second and third diode voltage, formed by bipolar diode-connected transistors, in series with current sources, and on the other hands calculating means including capacitive elements and switching elements for selectively and sequentially connecting, during a first and second phase, the capacitive elements to the means generating the diode voltages and to an circuit input to which the input voltage is applied. The calculating means provide, during the second phase, a signal representative of the difference between the input voltage and the reference level defined from the sum of the first diode voltage and the product of the difference between the second and third diode voltages by a determined coefficient.

An object of the present invention is to provide a temperature threshold detection circuit allowing a voltage representative of the circuit temperature to a reference level to be compared.

The present invention therefore concerns a temperature level detection circuit the features of which are listed in claim 1.

One advantage of the present invention lies in the fact that the temperature threshold of the detection circuit according to the present invention can be adjusted easily and accurately.

Other features and advantages of the invention will appear more clearly upon reading the following detailed description, made with reference to the annexed drawings given by way of non-limiting examples and in which.

Figure 1:
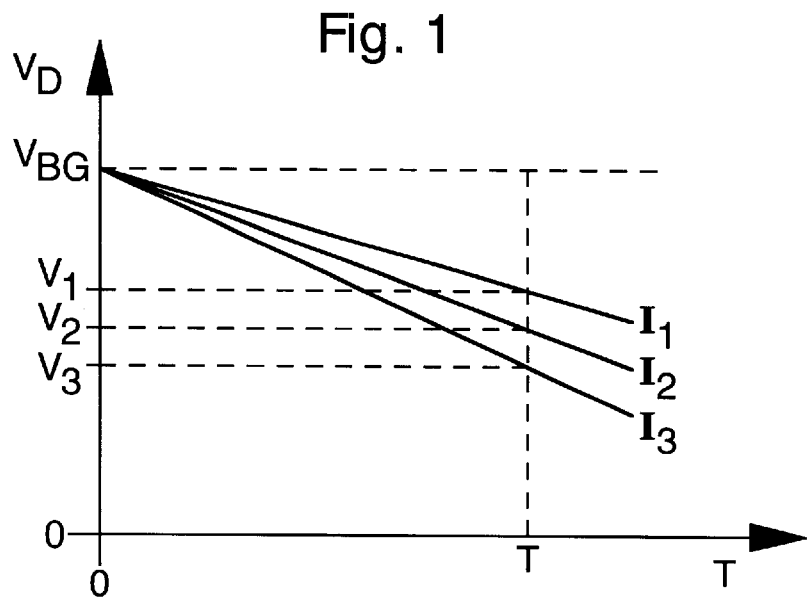
FIG. 1 is a diagram of the evolution of a diode voltage as a function of the temperature enabling the general operating principle of the detection circuit according to the invention to be explained.

The general operating principle of the detection circuit of the invention will be briefly explained by means of the diagram of FIG. 1 which shows the evolution, as a function of the temperature, of voltage $V_D$ across the terminals of a diode formed by the base-emitter junction of a bipolar transistor for three values $I_1$, $I_2$ and $I_3$ of the current passing through it.

This voltage thus has a linear evolution feature with a negative temperature .coefficient, i.e. it decreases in a linear manner when the temperature increases. When T tends towards 0° K., the diode voltage tends towards a value $V_{BG}$ denominated the bandgap value. In the case of silicon, this bandgap value is equal to approximately 1,205 volts. This diode voltage is substantially equal to:

$$V_D = V_{BG} - kT/e \ln (I_0/I) \quad (1)$$

where k is the Boltzman constant, e the charge of the electron and $I_0$ a value depending in particular on the surface of the device and equivalent concentrations of the conduction and valence states of the doped material.

Value $I_0$ is much greater than that of the current which passes through the diode; although it depends on the transistor manufacturing technology and slightly on the temperature, it may be considered that the factor $\ln (I_0/I)$ remains substantially constant for a given current I.

If two different currents $I_1$ and $I_2$ are passed in succession in the same diode or in two identical diodes, at a same temperature, the difference between the voltages which appear across its terminals or across their terminals is equal to:

$$\Delta V_{21} = V_2 - V_1 = kT/e \ln (I_2/I_1) \quad (2)$$

This difference is directly dependent on the temperature and has a positive or negative temperature coefficient according to whether current $I_2$ is greater than or less than current $I_1$.

Moreover, by adding a voltage proportional to this difference to diode voltage $V_3$ generated by the passage of a current $I_3$, for a same temperature one obtains:

$$V_3 + \alpha \Delta V_{21} = V_{BG} - kT/e (\ln (I_0/I_3) - \alpha \ln (I_2/I_1)) \quad (3)$$

By a suitable choice of proportionality coefficient $\alpha$ so that:

$$\ln (I_0/I_3) - \alpha \ln (I_2/I_1) = 0 \quad (4)$$

the quantity $V_3 + \alpha \Delta V_{21}$ can thus be made independent of the temperature and then equals bandgap value $V_{BG}$.

Figure 2:
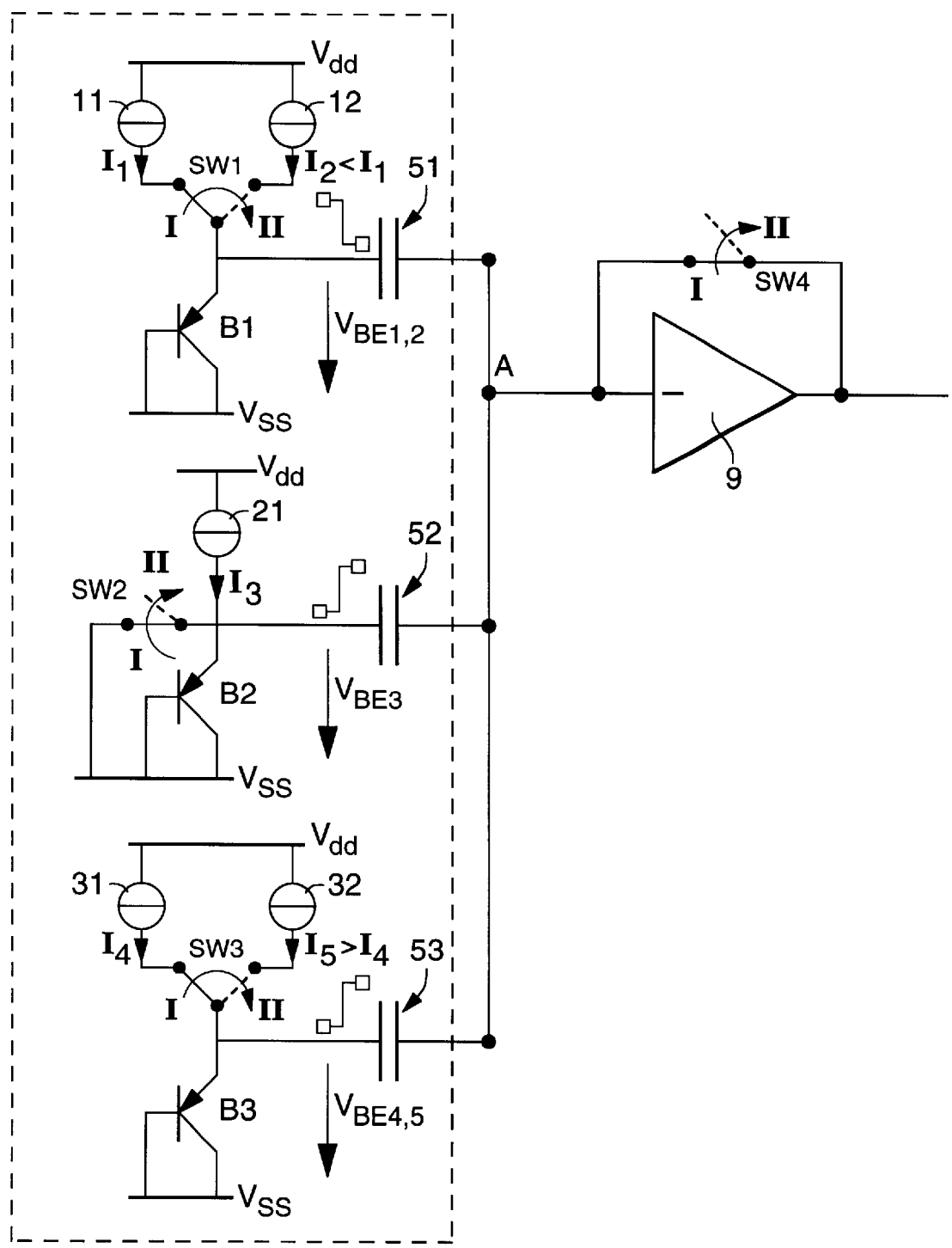
FIG. 2 is an embodiment example of the detection circuit according to the invention.

FIG. 2 shows a first embodiment example of the temperature level detection circuit according to the present invention. This circuit includes three bipolar PNP type transistors B1, B2, B3 connected in diode, i.e. whose base and collector are connected to each other, themselves connected to one of the supply terminals of the circuit onto which is applied a potential $V_{ss}$ which will be considered, in the following description, as forming the detection circuit earth. Bipolar transistors B2 and B3 are chosen to be substantially identical.

First and second current sources 11 and 12 respectively generating currents $I_1$ and $I_2$ are arranged between the emitter of transistor B1 and the other supply terminal of the circuit onto which a positive potential $V_{dd}$ is applied. These current sources 11 and 12 are selectively connected to the emitter of transistor B1 by means of a switch SW1 so that currents $I_1$ or $I_2$ selectively pass through the base-emitter junction of transistor B1 when switch SW1 is in position "I", indicated by the full lines, or in position "II" indicated by the dotted lines. First and second diode voltages $V_{BE1}$ and $V_{BE2}$ are thus successively generated.

A third current source 21 is arranged between the emitter of transistor B2 and the supply terminal of the circuit onto which potential $V_{dd}$ is applied. This current source 21 maintains a constant current $I_3$ through the base-emitter junction of transistor B2. A switch SW2 is further arranged between the emitter of transistor B2 and the circuit's earth. When this switch SW2 is in position "I", the emitter of transistor B2 is thus connected to the circuit's earth. In the opposite case, when this switch is in position "II", current $I_3$ passes through the base-emitter junction and a third diode voltage $V_{BE3}$ is generated.

Fourth and fifth current sources 31 and 32 respectively generating currents $I_4$ and $I_5$ are also arranged between terminal $V_{dd}$ of the circuit and the emitter of transistor B3. These current sources 31 and 32 are selectively connected to the emitter of transistor B3 by means of a switch SW3 so that currents $I_4$ or $I_5$ selectively pass through the base-emitter junction of transistor B3 when switch SW3 is in position "I" or "II". Fourth and fifth diode voltages $V_{BE4}$ and $V_{BE5}$ are thus successively generated.

Currents $I_1$ and $I_5$ are determined so that they are respectively greater than currents $I_2$ and $I_4$.

The circuit of FIG. 2 further includes three capacitive elements 51, 52 and 53 respectively connected by one of their terminals to the emitter of transistors B1, B2 and B3. The other terminals of capacitive elements 51, 52 and 53 are together connected to a node A at the inverting input of a very high gain amplifier 9. A switch SW4 allows the output of amplifier 9 to be connected to or disconnected from its input. Capacitive elements 51, 52, 53 have respectively capacitance values C1, C2, C3.

In a first phase, switches SW1, SW2, SW3, SW4 are placed in position "I" shown in a full line in the Figure. Amplifier 9 is then subjected to a total counter-reaction and automatically polarises at a stable operating point, its input voltage $V_E$ being then equal to its output voltage and its maximum gain. Capacitive elements 51, 52, 53 are thus respectively charged at voltages $(V_E-V_{BE1})$, $V_E$, and $(V_E-V_{BE4})$.

In a second phase, when switches SW1, SW2, SW3, SW4 are placed in position "II" shown in a dotted line in the Figure, capacitive elements 51, 52, 53 inject into input node A of amplifier 9, left floating, electric charges respectively equal to $C1(V_{BE2}-V_{BE1})$, $C2\,V_{BE3}$ and $C3(V_{BE5}-V_{BE4})$, the charge injected by element 51 being of the opposite sign to the charges injected by elements 52 and 53.

The total charge injected into node A can be expressed in the following form:

$$\alpha_1(V_{BE2}-V_{BE1})+\alpha_2(V_{BE3}+\alpha_3(V_{BE5}-V_{BE4})) \quad (5)$$

where $\alpha_1=C1$, $\alpha_2=C2$ and $\alpha_3=C3/C2$.

By a suitable choice of values C2 and C3 of capacitive elements 52 and 53, according to the principle described hereinbefore (according to equations (3) and (4) with $\alpha=\alpha_3=C3/C2$), the second part of the equation can be made independent of the temperature and equal to the value $\alpha_2 V_{BG}$. Equation (5) can then be expressed as follows:

$$\alpha_2 V_{BG}-\beta T \quad (6)$$

where $\beta$ is a positive defined temperature coefficient essentially determined by the logarithmic ratio of currents $I_1$ and $I_2$ passing through the base-emitter junction of transistor B1 and having the value:

$$\beta=\alpha_1 k/e \ln(I_1/I_2) \quad (7)$$

Figure 3:
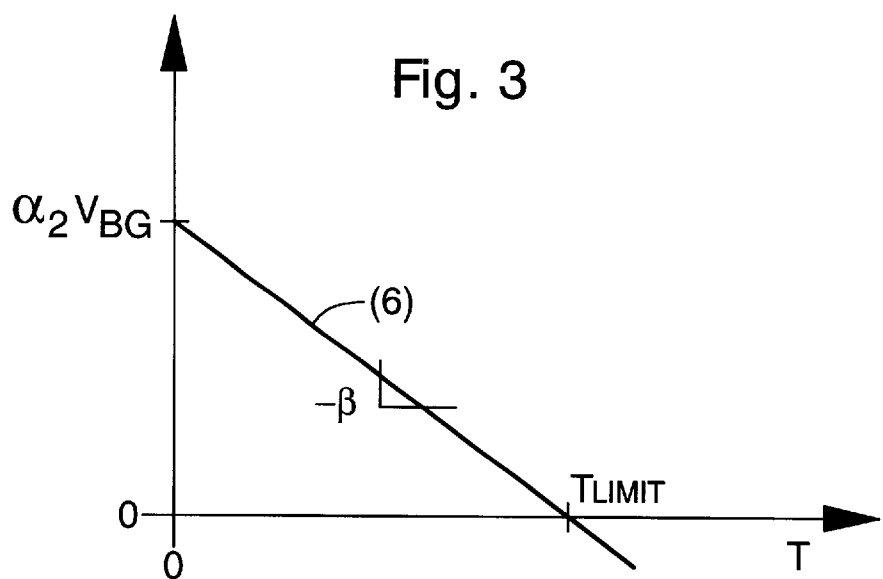
FIG. 3 is an evolution diagram as a function of the temperature enabling the operation of the detection circuit of FIG. 2 to be explained.

FIG. 3 shows a diagram illustrating the evolution of the charge transmitted into input node A of amplifier 9 as a function of the temperature T corresponding to the above equation (6).

It will be noted in this diagram that the total charge transmitted into node A of amplifier 9 becomes zero at a temperature $T_{LIMIT}$ defined by coefficients $\alpha_1$ and $\alpha_2$, namely values C1 and C2 of capacitive elements 51 and 52, the value of bandgap $V_{BG}$ and coefficient $\beta$ defined hereinbefore which depend, as was already mentioned on the logarithmic ratio of currents $I_1$ and $I_2$ passing through the base-emitter junction of transistor B1. Consequently, no signal appears at the input of amplifier 9 when the temperature is equal to $T_{LIMIT}$.

Conversely, if the temperature differs from that of threshold temperature $T_{LIMIT}$, a voltage variation appears at the amplifier input the polarity of which is representative of the sign of the total charge injected into input node A. This signal is amplified and inverted by amplifier 9 which provides an amplitude output signal much greater than that of the signal applied to its input. This output signal from amplifier 9, of logic level, can thus be used as control signal, in order, for example, to protect a circuit against damage caused by too high operating temperatures.

Moreover, it is be noted from the foregoing that the circuit according to the present invention has the advantage of being able to adjust temperature threshold $T_{LIMIT}$ of the detection circuit easily and accurately. In fact it is very easy with MOS technology to make very precise capacitance ratios for capacitive elements.

On the other hand, as is clear from equations (6) and (7) above, it is also possible to adjust temperature threshold $T_{LIMIT}$ by acting on the ratio of currents $I_1$ and $I_2$. Indeed, the value of coefficient $\beta$ appearing in equation (6) above depends directly on the logarithmic ratio of currents $I_1$ and $I_2$ delivered by current sources 11 and 12. It is thus possible, as long as the current delivered by one of current sources 11 or 12 can be adjusted, to adapt temperature threshold $T_{LIMIT}$, even after having programmed capacitive elements 51, 52 and 53. Thus, with the detection circuit according to the present invention one has great flexibility to adjust the value of temperature threshold $T_{LIMIT}$.

The circuit according to the present invention further operates very quickly, the time necessary to calculate and compare being essentially consecrated to the phase of charging the capacitive elements and polarising the amplifier.

Moreover, amplifier 9 is only used to amplify sufficiently the signal appearing at input node A so that the output signal can properly drive another circuit. One can thus simply use a single stage amplifier formed, in the manner of an inverter, by two complementary transistors mounted with a common source whose drains are connected to each other.

It may to noted in the foregoing that it is not necessary to actually generate the three voltages $V_{BE3}$, $V_{BE4}$ and $V_{BE5}$, two voltages being sufficient. It is thus possible to omit transistor B2, and to use diode voltage $V_{BE5}$ generated by transistor B3 during the second phase as third diode voltage $V_{BE3}$.

Figure 4:
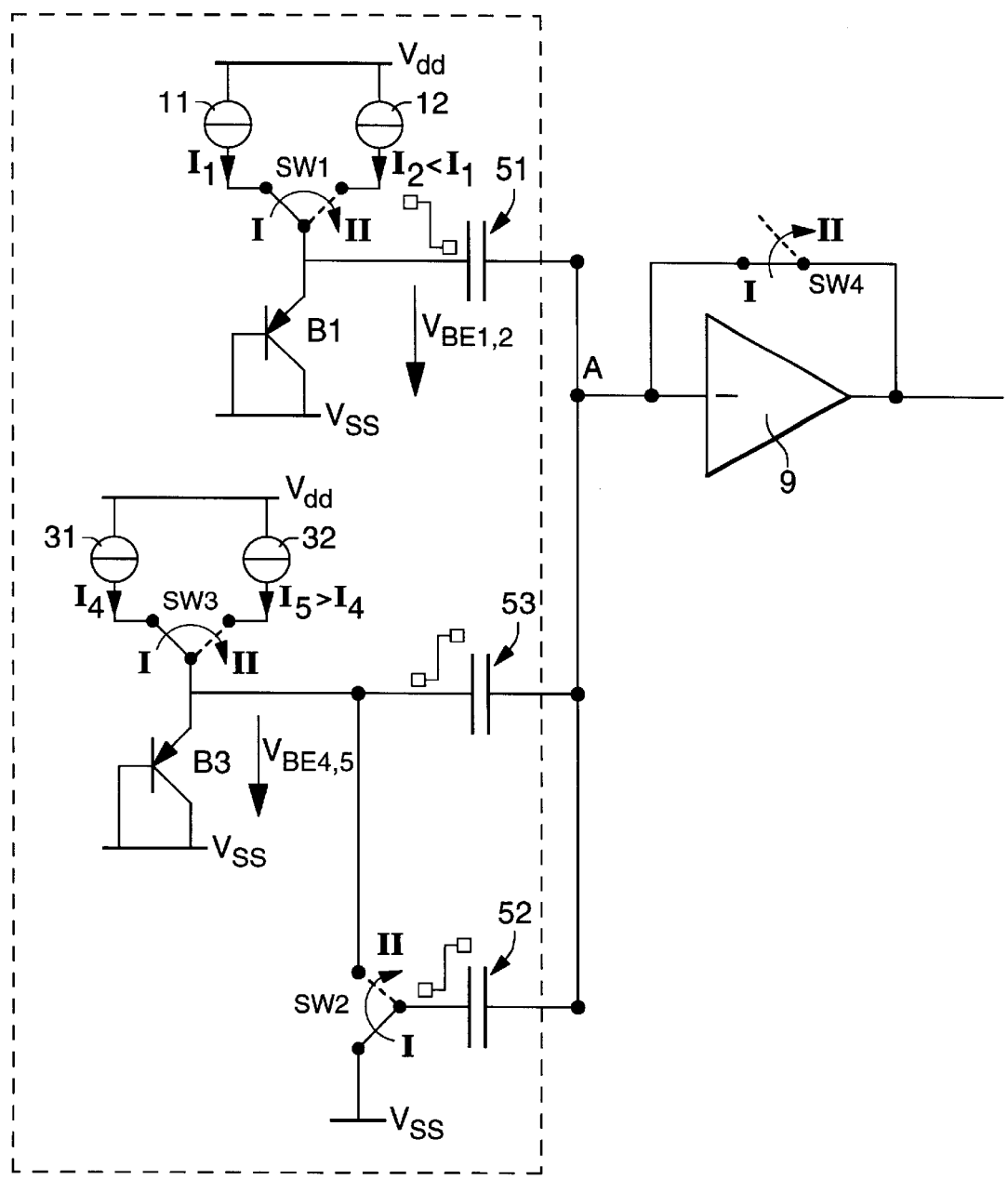
FIG. 4 is another embodiment example of the detection circuit according to the invention.

FIG. 4 shows an example of such a circuit in which transistor B2 and the associated current source 21 have been omitted. In this example, capacitive element 52 is thus connected, via switch SW2 first of all to the circuit's earth during the first phase then, during the second phase, to the emitter of transistor B3.

What is claimed is:

1. A temperature level detection circuit arranged to generate a temperature signal representative of said temperature level being greater than or less than a determined temperature threshold $T_{LIMIT}$, wherein said circuit includes:

means for generating diode voltages; and calculating means for generating said temperature signal, these calculating means including capacitive elements and switching means arranged to connect selectively and sequentially, during a first and a second phase, said capacitive elements to said means for generating said diode voltages so that said calculating means generate said temperature signal during said second phase, said temperature threshold $T_{limit}$ being defined as the temperature value for which the equation $\alpha_1(V_{BE2}-V_{BE1})+\alpha_2(V_{BE3}+\alpha_3(V_{BE5}-V_{BE4}))$ becomes zero, where at, $\alpha_2$, and $\alpha_3$ are first, second and third proportionality coefficients determined by the values of said capacitive elements and $V_{BE1}$ to $V_{BE5}$ are first, second, third, fourth and fifth diode voltages, the third diode voltage being able to be equal to any one of the other diode voltages.

2. The detection circuit according to claim 1, wherein said calculating means are arranged to generate:
   a first signal dependent of the temperature representative of the product by said first proportionality coefficient of the difference between the first and second diode voltages, and
   a second signal independent of the temperature representative of the product by said second proportionality coefficient of the sum of said third diode voltage and the product by said third proportionality coefficient of the difference between said fourth and fifth diode voltages.

3. The detection circuit according to claim 2, wherein said calculating means are arranged to generate:
   a third signal representative of the product of said third diode voltage by said second proportionality coefficient, and
   a fourth signal representative of the product of the difference between said fourth and fifth diode voltages by said second and third proportionality coefficients; these third and fourth signals being added to generate said second signal.

4. The detection circuit according to claim 3, wherein said calculating means include:
   for generating said first signal, a first capacitive element of substantially equal capacitance to said first proportionality coefficient,
   for generating said third signal, a second capacitive element of substantially equal capacitance to said second proportionality coefficient, and
   for generating said fourth signal, a third capacitive element of substantially equal capacitance to the product of said second and third proportionality coefficients.

5. The detection circuit according to claim 1, wherein said means for generating said diode voltages include bipolar transistors connected in series with current sources and whose base is connected to the collector.

6. The detection circuit according to claim 4, wherein said means for generating said diode voltages include three bipolar transistors whose base is connected to the collector, a first and second of said transistors being each successively connected in series with two current sources, a third of said transistors being connected in series with a current source, the second and third transistor being substantially identical.

7. The detection circuit according to claim 4, wherein said means for generating said diode voltages include two bipolar transistors whose base is connected to the collector, each of said transistors being connected successively in series with two current sources.

* * * * *

UNITED STATES PATENT AND TRADEMARK OFFICE
CERTIFICATE OF CORRECTION

| | | |
|---|---|---|
| PATENT NO. | : 6,225,851 B1 | Page 1 of 1 |
| DATED | : May 1, 2001 | |
| INVENTOR(S) | : Arthur Descombes | |

It is certified that error appears in the above-identified patent and that said Letters Patent is hereby corrected as shown below:

<u>Column 5, claim 1,</u>
Line 7, "where at" should be changed to -- where $\alpha_1$. --

Signed and Sealed this

Fifth Day of March, 2002

Attest:

JAMES E. ROGAN
*Attesting Officer*     *Director of the United States Patent and Trademark Office*